UNITED STATES PATENT OFFICE.

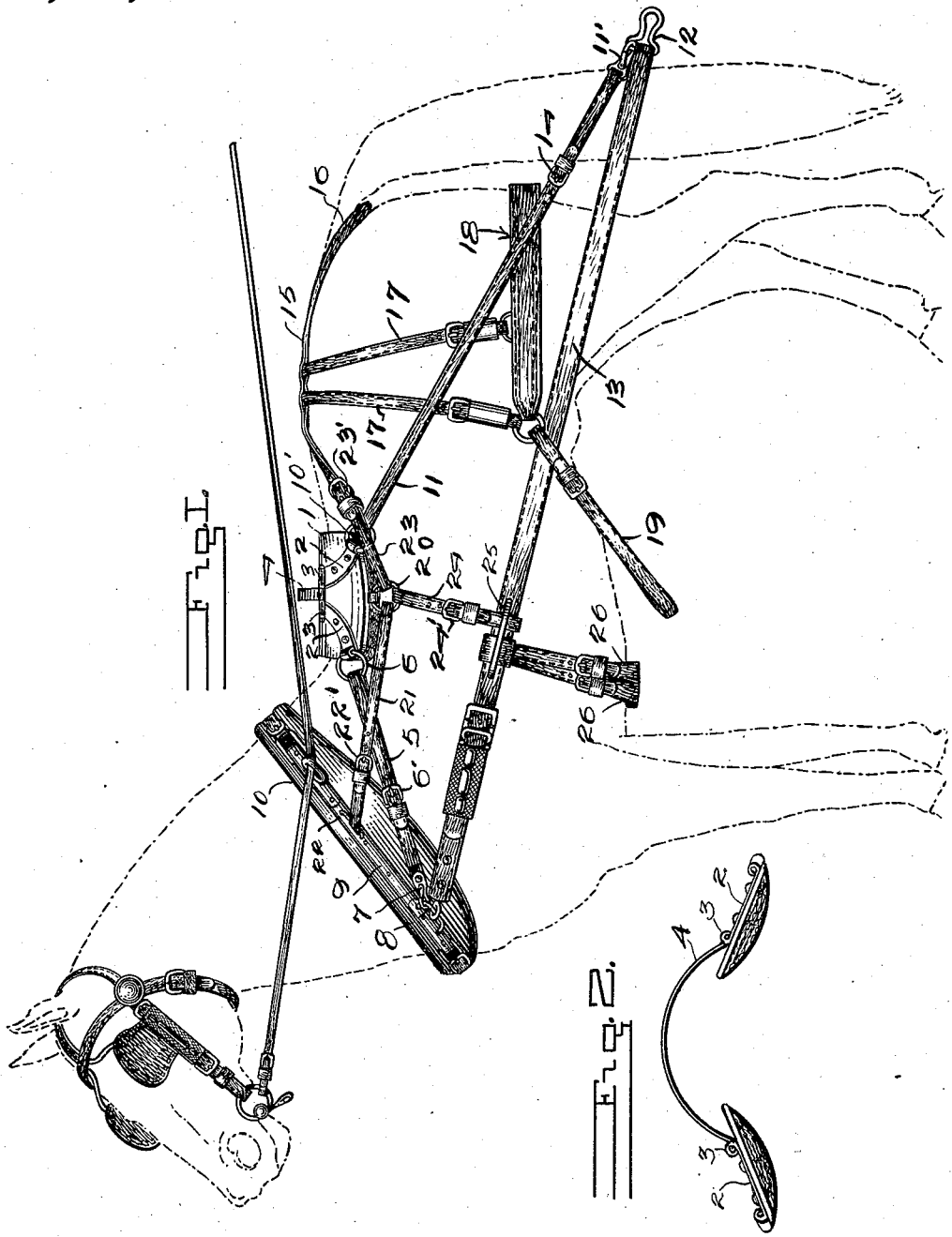

CHARLES M. GREEN, OF GARDEN CITY, KANSAS.

HARNESS ATTACHMENT.

1,028,711. Specification of Letters Patent. Patented June 4, 1912.

Application filed April 4, 1911, Serial No. 618,818. Renewed February 20, 1912. Serial No. 678,955.

*To all whom it may concern:*

Be it known that I, CHARLES M. GREEN, a citizen of the United States, residing at Garden City, in the county of Finney and State of Kansas, have invented certain new and useful Improvements in Harness Attachments, of which the following is a specification, reference being had therein to the accompanying drawing.

This invention relates to attachments for harness to be used in connection with the collar whereby the collar will be steadily held in place upon a horse's neck and pressure against the horse's throat when draft is applied to the collar will be relieved.

The invention has for its object to provide an improved attachment of this kind by means of which the weight and pressure of the collar upon the horse's neck will be removed and the collar prevented from moving backward and forward on the horse's neck thereby not only avoiding creating a sore neck but also in case the horse's neck should be sore to relieve him by removing the weight of the collar from the draft of the vehicle upon such sore neck.

Another object of this invention is to provide in conjunction with means for relieving the pressure of the collar upon the horse's neck and for sustaining it in position thereon a saddle adapted to fit horses' backs of different sizes.

In the accompanying drawings: Figure 1 shows a horse equipped with harness provided with the attachment constructed in accordance with this invention. Fig. 2 is a detail view of the saddle.

In carrying out the invention, a saddle 1 is provided which may be constructed in any suitable manner and may be made of wood, zinc, galvanized iron, or other suitable material provided with a felt lining. The saddle 1 is preferably formed in two sections to overlap the back of a horse, hinged together in any suitable manner, and as here shown, by means of two pairs of curved metallic straps 2 riveted to the sections of the saddle and hinged together at the points 3 thereby permitting the saddle or pad to be fitted to the backs of horses of different sizes. The saddle 1 is provided with a suitable spring 4 which serves to hold down the sections of the saddle against the back of the horse.

The attachment for holding the collar in the proper position consists of an adjustable strap 5 located on each side of the collar and extending through a ring 6 mounted on one end of one of the metallic straps 2 on each side of the forward end of the saddle 1, and adjustably secured by a buckle 6'. The outer end of said strap is connected by a snap hook 7 with a loop 8 on the hame 9 of the collar 10. Each of the hames is connected as just described by a strap 5 with the forward end of the saddle 1.

Extending from a ring 10' on the end of the rear metallic strip 2 on each side of the saddle 1 is a strap 11 which extends to the end of the trace and is connected at its rear end by a snap hook 11' with the ring 12 on the end of the trace 13. The strap 11 is adjusted in length by means of a buckle 14. By shortening or lengthening the strap 11 the draft can be increased to any point desired. In so doing a twenty-inch collar can be employed on a sixteen or eighteen-inch neck of a horse since the collar can be held up at the bottom close to the horse's throat and yet will not choke him.

(15) indicates the back strap terminating in the crupper 16 provided on each side with the straps 17 supporting the breeching 18 provided with the usual breech straps 19. The saddle 1 is provided on each side with a ring 20 and a strap 21 connects each of the hames 9 with the ring 20 on each side of the saddle, said strap engaging a loop 22 on the hame 9 and adjustable by means of a buckle 22'. A strap 23 is connected with the ring 20 on each side of the saddle and engages with the back strap 15, said strap 15 being adjustable by means of the buckle 23'. A strap 24 adjustable by means of a buckle 24' is connected with the ring 20 on each side of the saddle 1 and extends over the trace 13 and through the loop 25 in the side of the trace.

26 indicates the usual belly bands.

By means of the connections hereinbefore described, the straps 5 on each side of the collar coöperate with the saddle 1 and the straps 11 to hold the collar against the throat of the horse without undue pressure thereon, and the straps 21 on each side of the collar coöperate to hold the collar in place and prevent it from moving up and down and rubbing the neck of the horse.

As hereinbefore stated, the straps 11 on each side of the horse coöperate with the saddle 1, and the straps 5 to hold the collar in proper position on the horse's neck, accordingly as the straps 11 are adjusted in length to relieve the draft and pressure against the horse's neck caused by the collar.

As shown in Fig. 2 the pads of the saddle are located at a little distance apart from each other and are connected by an arched spring 4, thereby adapting the saddle for use with horses of different sizes and also avoiding any pressure on the back bone of the horse.

Having described the invention, what I claim as new is.

1. In a harness, a saddle, a collar, traces, straps connecting each side of said saddle with each side of said collar, straps connecting each side of said saddle with the ends of the traces and straps connecting the sides of said saddle with the collar and with the back strap of the harness.

2. In a harness, a collar, a saddle, traces, a strap on each side of the collar connecting it with the forward end of the saddle, a strap on each side of the saddle connecting it with the rear ends of the trace, a strap on each side of the collar connecting it with each side of the saddle, and a strap on each side of the saddle connecting it with the back strap.

3. In a harness, a collar, a saddle, traces, a strap on each side of the collar connecting the lower end of the collar with the forward end of the saddle, a strap connected to and extending from the rear end of the saddle and connected with the rear end of a trace, said strap being adjustable, a strap on each side of the collar extending from its upper portion to the side of the saddle, and a strap on each side of the saddle extending to the back strap.

4. In a harness, a collar, a saddle, traces, a strap on each side of the collar connected thereto at its lower end adjacent to the forward end of the trace, said strap being connected at its other end to the forward end of the saddle, a strap extending from the rear end of each side of the saddle to the end of the trace, and adjustable in length, a strap on each side of the collar extending from its upper portion and connected to the side of the saddle, a strap extending from each side of the saddle to the back strap, and a strap extending from each side of the saddle and connected with each trace.

5. In a harness, a collar, a saddle, traces, a strap on each side of said collar connected at one end to the lower end of the hame and at the other end to the forward end of the saddle, a strap adjustable in length located on each side of the saddle and connected at one end to the rear end of the trace, a ring depending from each side of the saddle, a strap connected at one end to the hame adjacent to its upper end and at the other end to said ring, a strap on each side of the saddle connected at one end to said ring, and at its other end to the back strap, and a strap connected to a ring on each side of the saddle and to a trace on each side of the harness.

6. A collar, a saddle provided with metallic brace straps, a ring on each side of the saddle at its forward and rear ends, an adjustable strap on each side of the collar connected at its rear end to a ring on the forward end of the saddle and at its forward end to the lower end of the hame, an adjustable strap connected at one end of each side of the saddle to the ring at its rear end, the other end of said strap being connected to the trace, a ring on each side of the saddle midway between its ends, an adjustable strap connected at one end to each hame adjacent to its upper end and at its other end to said ring, an adjustable strap on each side of the saddle connected to said ring and to the back strap, and a strap on each side connecting said ring with a trace.

In testimony whereof I hereunto affix my signature in presence of two witnesses.

CHARLES M. GREEN.

Witnesses:
 W. C. PEARCE,
 A. L. LOGAN.

---

Copies of this patent may be obtained for five cents each, by addressing the "Commissioner of Patents, Washington, D. C."